United States Patent [19]
Hunt et al.

[11] Patent Number: 5,515,668
[45] Date of Patent: May 14, 1996

[54] LANING CONVEYOR WITH CHANGEOVER SYSTEM

[75] Inventors: Gary D. Hunt, Lake Mary; Dave Cooley, Sanford; John M. Connor, Longwood; Keith B. Weisenstein, Deltona; Roger K. Calabrese, Sanford; Gregory S. Gulik, Deltona; Archie Koster, Casselberry; David A. Foskett, Orlando, all of Fla.

[73] Assignee: Simplimatic Engineering Company, Lynchburg, Va.

[21] Appl. No.: 116,368

[22] Filed: Sep. 3, 1993

[51] Int. Cl.[6] .................................. B65B 35/30
[52] U.S. Cl. ........................ 53/543; 53/247; 53/251; 53/566; 53/539; 198/446; 198/836.3
[58] Field of Search .......................... 198/445, 446, 198/836.3; 53/246, 247, 251, 534, 539, 543, 566; 493/478, 479

[56] References Cited

U.S. PATENT DOCUMENTS

| | | |
|---|---|---|
| 2,156,020 | 4/1939 | Lathrop . |
| 2,422,726 | 6/1947 | Goldacker . |
| 2,451,104 | 10/1948 | Lowe . |
| 2,600,878 | 6/1952 | Jensen . |
| 2,679,309 | 5/1954 | Reading . |
| 2,819,576 | 1/1958 | Hendricks et al. ............. 53/539 |
| 2,838,896 | 6/1958 | Currivan et al. ............. 53/539 |
| 2,869,297 | 1/1959 | Neer ............. 53/543 X |
| 2,951,574 | 9/1960 | Craig . |
| 3,340,676 | 9/1967 | Arnett ............. 53/247 |
| 3,353,331 | 11/1967 | Rowekamp ............. 53/539 |
| 3,428,161 | 2/1969 | Niederer . |
| 3,487,908 | 1/1970 | Garrett ............. 198/446 |
| 3,513,623 | 5/1970 | Pearson . |
| 3,554,353 | 1/1971 | Raudat . |
| 3,561,189 | 2/1971 | Raudat . |
| 3,767,027 | 10/1973 | Pund et al. . |
| 3,965,650 | 6/1976 | Nussbaum ............. 53/539 |
| 4,029,195 | 6/1977 | Harthess et al. ............. 198/445 X |
| 4,060,166 | 11/1977 | Harthess et al. ............. 198/446 |
| 4,173,276 | 11/1979 | Raudat et al. . |
| 4,642,967 | 2/1987 | Culpepper ............. 53/543 X |
| 4,880,104 | 11/1989 | Evans et al. . |
| 4,966,272 | 10/1990 | Raudat . |
| 4,986,056 | 1/1991 | Evans et al. . |
| 5,056,298 | 10/1991 | Deadmond . |
| 5,241,805 | 9/1993 | Johnson ............. 53/251 X |

Primary Examiner—John Sipos
Assistant Examiner—Daniel Moon
Attorney, Agent, or Firm—St. Onge Steward Johnston & Reens

[57] ABSTRACT

A laning conveyor is provided which may be used as an infeed for a packer. The laning conveyor comprises a central lane guide and a movable lane guide unit including at least two lane guides connected thereto spaced apart a first lane width. The unit is mounted adjacent the central lane guide to form a lane therebetween having the first lane width. The unit is movable to provide the lane with a second lane width. A method of laning articles is also disclosed.

13 Claims, 9 Drawing Sheets

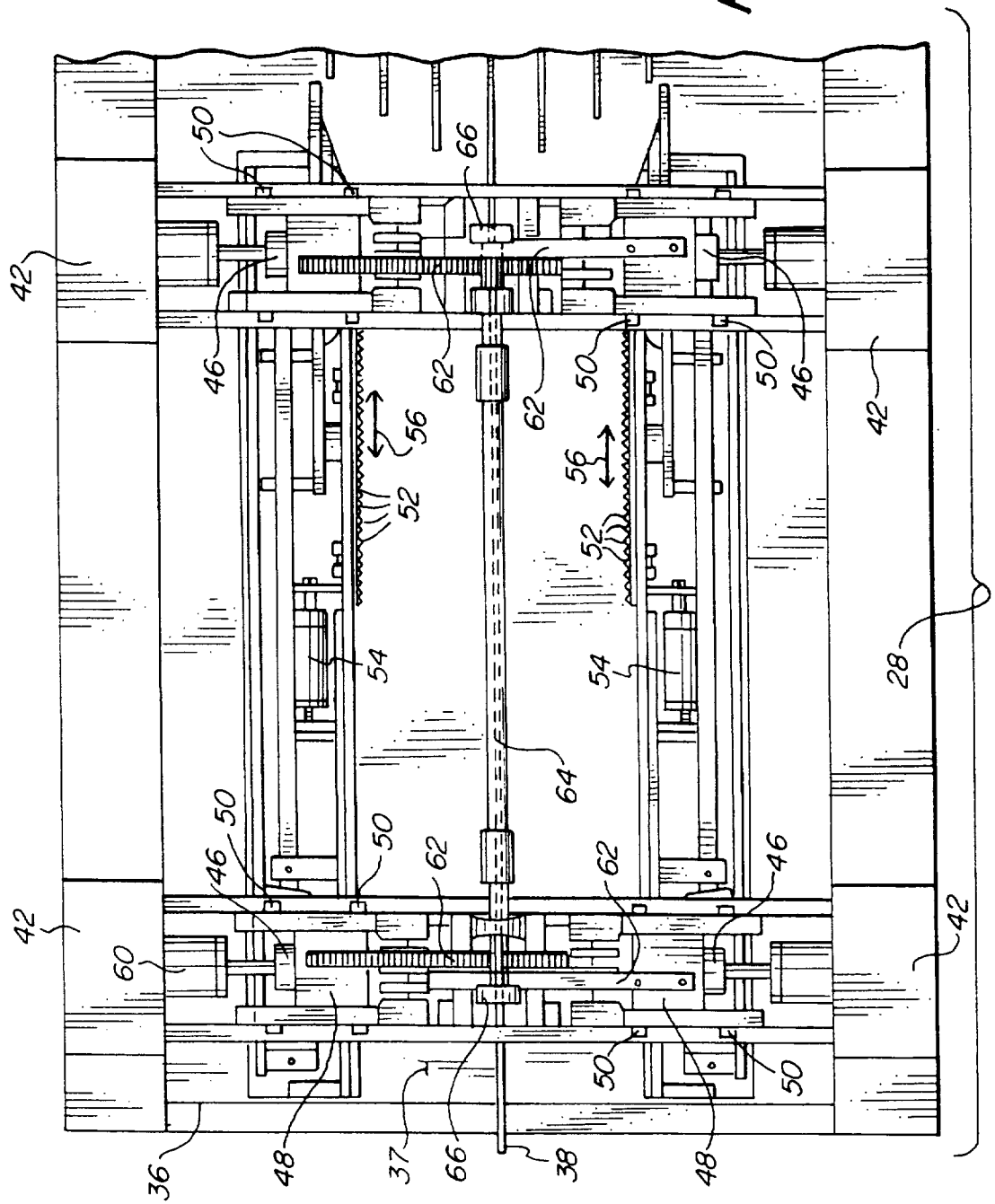

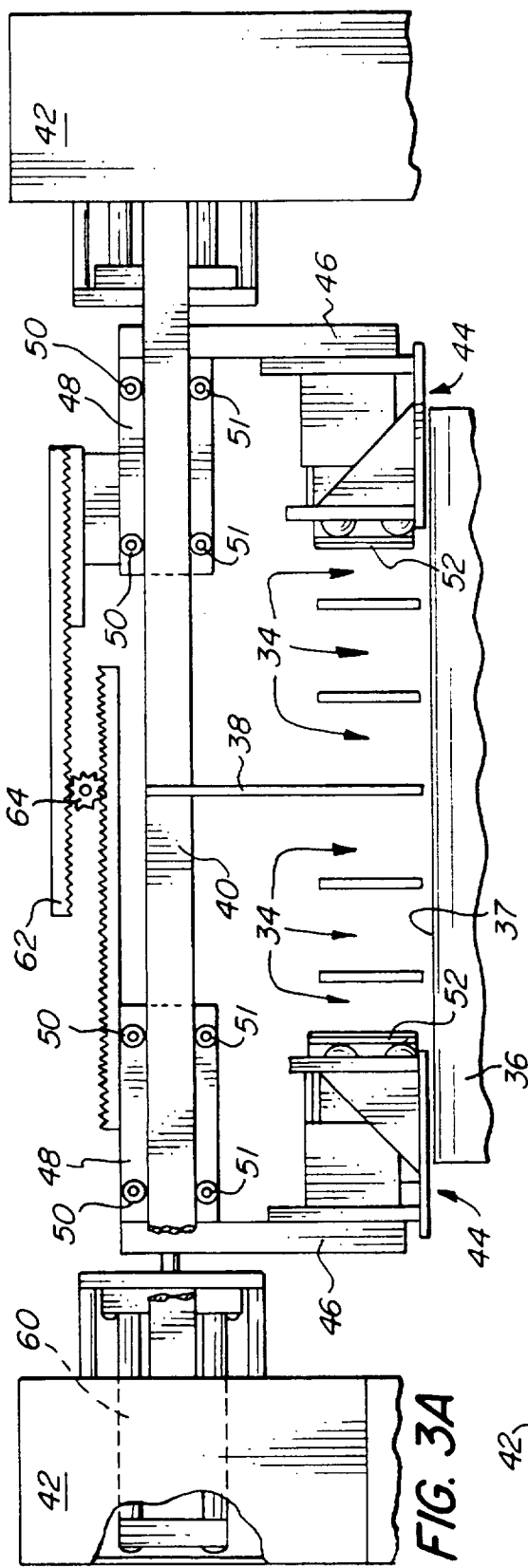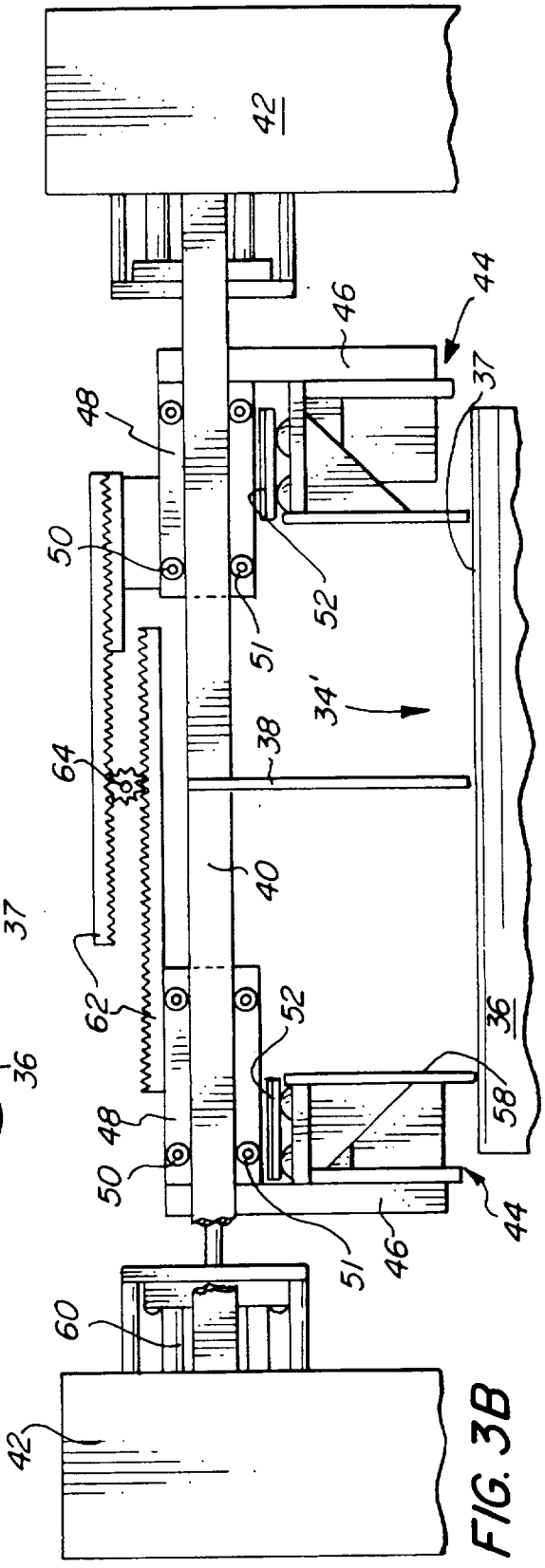

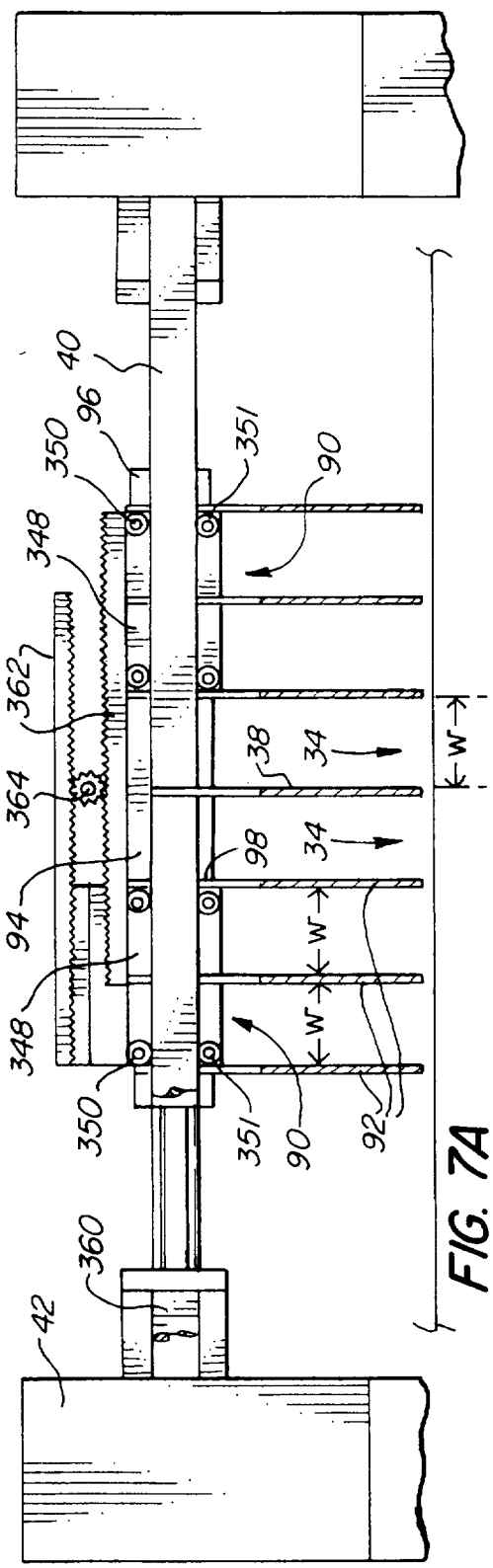
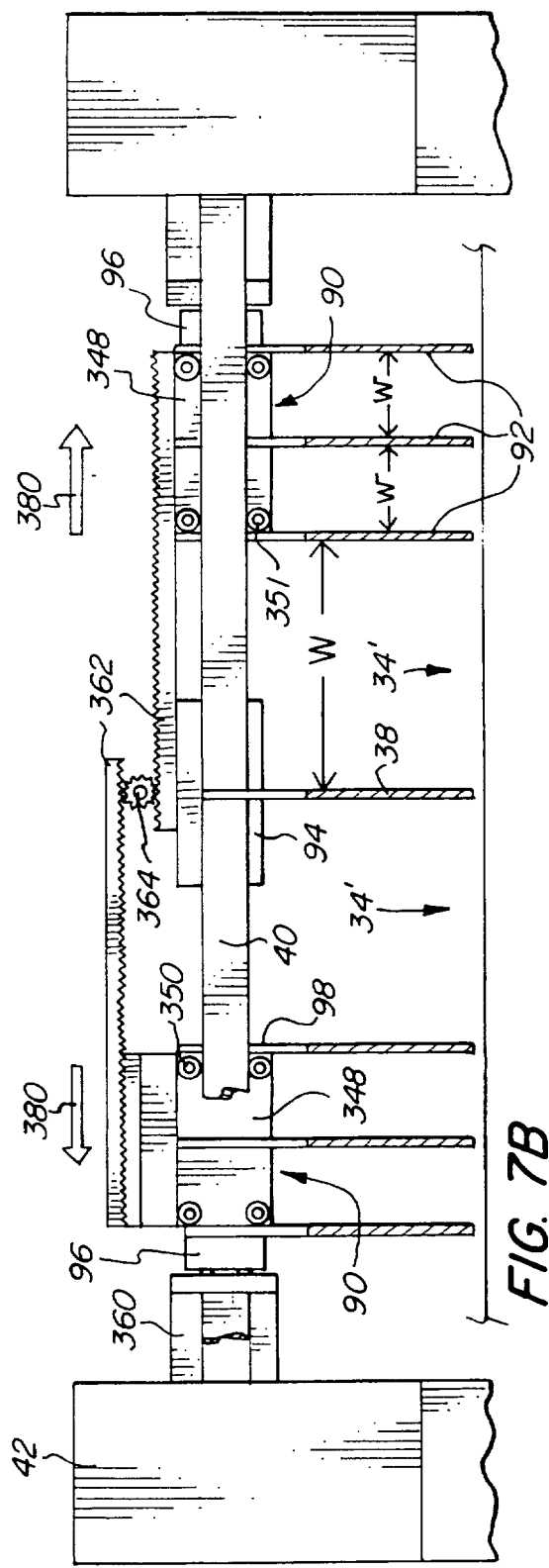

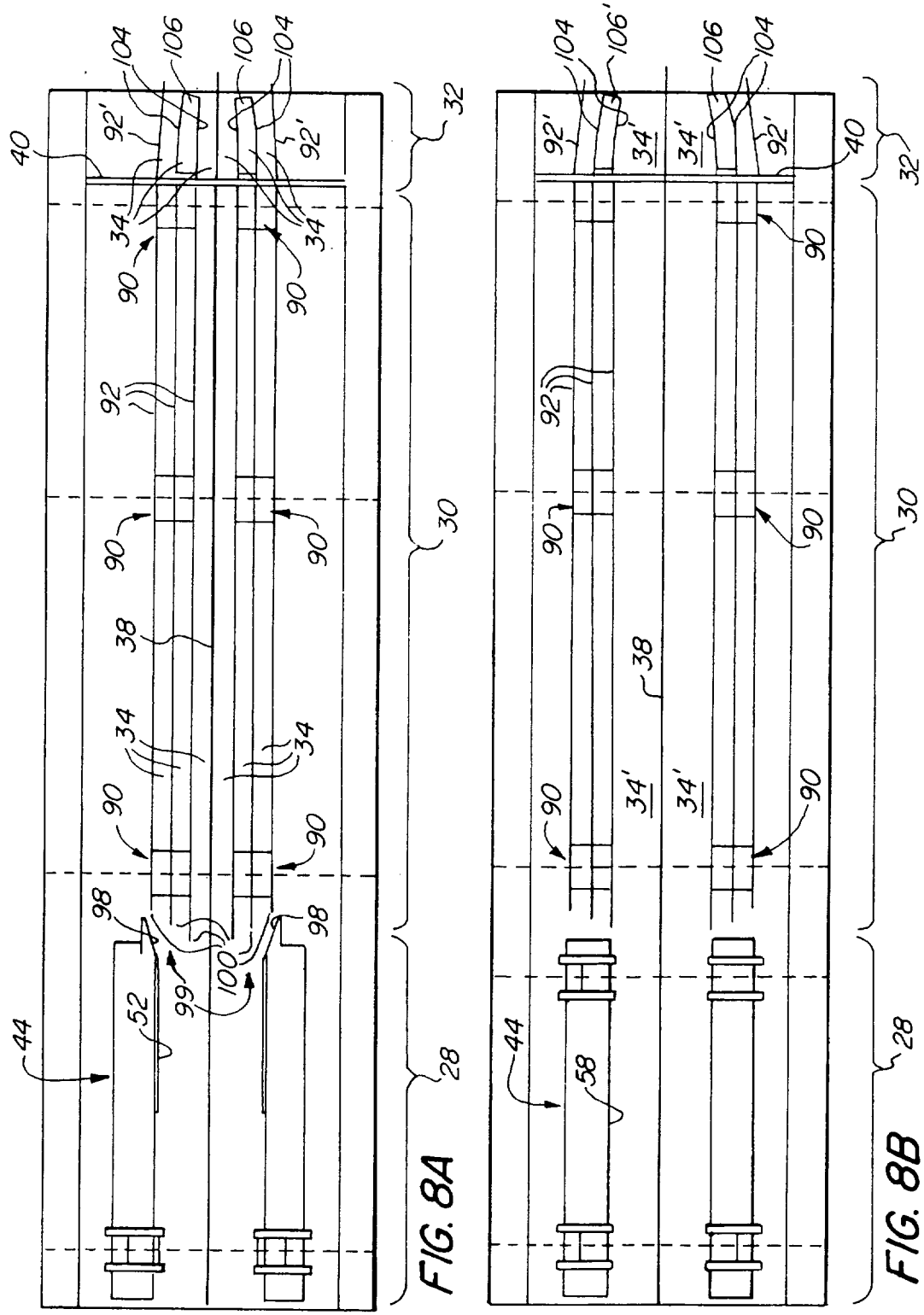

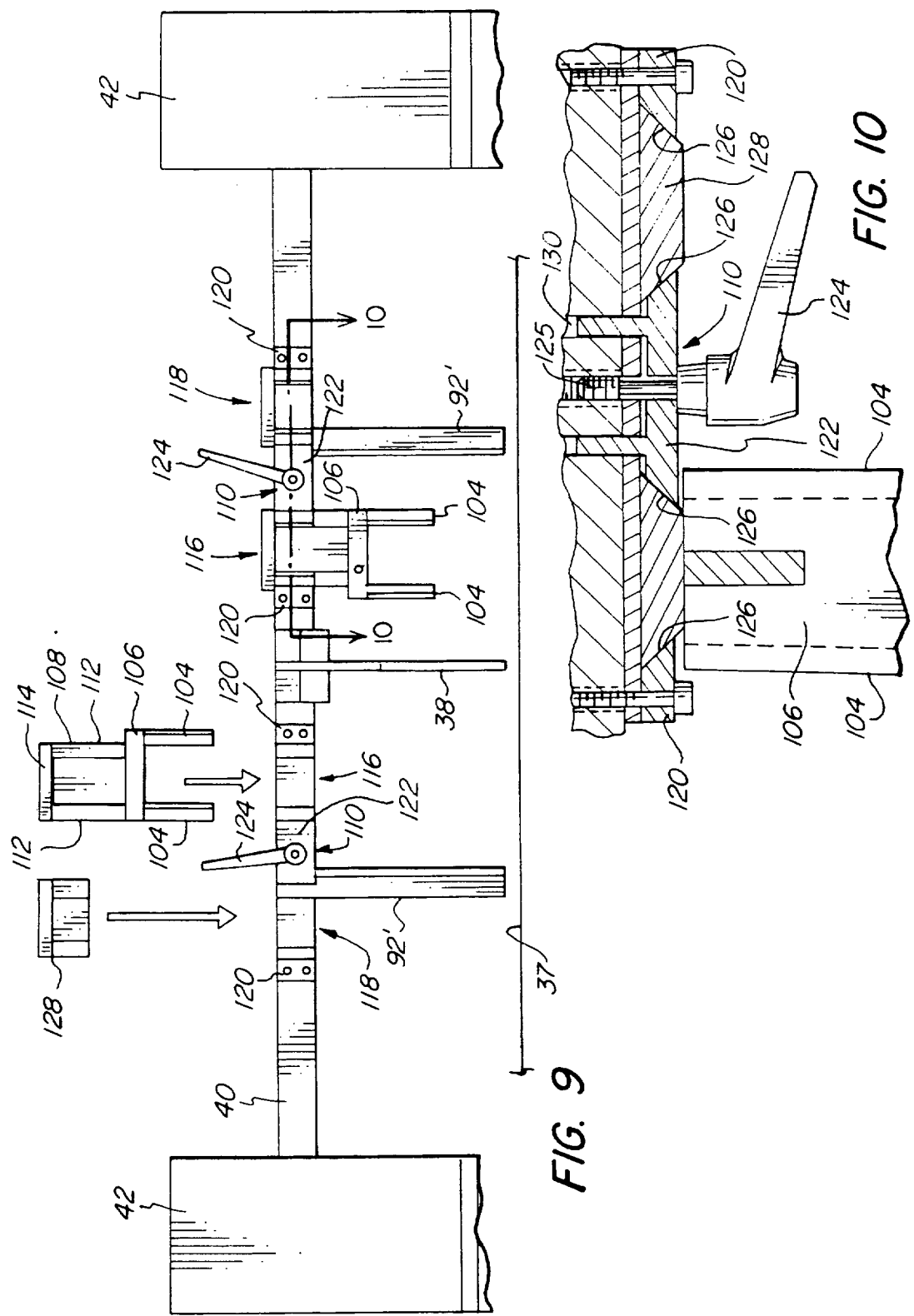

LANING CONVEYOR WITH CHANGEOVER SYSTEM

FIELD OF THE INVENTION

The invention relates to a system for changing the number, spacing, or both of conveyor lanes. The lanes receive articles, such as cans, bottles or multi-packs, arrange them into two or more single files, and pass them downstream to a packer or other equipment.

BACKGROUND OF THE INVENTION

In industrial facilities such as food or beverage plants, it is often necessary to convert a mass of articles into two or more single files of articles. For example, single filing may be used to distribute the articles to a plurality of relatively slow downstream stations in order to improve or maintain article throughput in the plant, or to arrange articles abreast in transverse rows for packing or other downstream operations.

In order to improve the usefulness of laning conveyors, prior designs provide mechanisms for lane width adjustment. U.S. Pat. Nos. 4,880,104 and 4,986,056 disclose a lane adjusting apparatus including movable lane guides connected by threaded telescoping elements to a common drive shaft for uniform width adjustment. U.S. Pat. No. 2,951,574 discloses opposite thread mounted outer lanes uniformly movable together and apart upon rotation of the shaft as intermediate lanes are coordinately slid along the shaft with "lazy-tongs linkages." U.S. Pat. No. 3,767,027 discloses pantographs and bushings for moving lanes to maintain uniform widths. U.S. Pat. No. 3,554,353 discloses opposite thread mounted outside lane guides and coil springs separating intermediate lane guides to assure equal widths.

Since all lanes are maintained with equal widths, the prior art devices are effectively limited to relatively small lane width adjustments. The prior art devices would not efficiently handle articles wherein larger ones of the articles have widths about two or more times greater than widths of smaller ones of the articles conveyed. In order to accommodate such a range of article widths, prior art conveyors would have to be twice as wide as necessary to handle only the smaller size ones of the articles.

The prior art devices are also designed for downstream operations using the same number of article single files regardless of article size. Thus, prior art devices would not efficiently service downstream operations in which article width is inversely related to the required number of lanes.

For example, in food or beverage plants, cases of cans (e.g., 12, 24 or 32) are packed either from individual cans, or from six-packs or other prepackaged units of cans (e.g., 8-packs or 12-packs). Although the prepackaged units are articles of greater width than the individual cans, fewer lanes of units are needed to pack a case.

What is desired, therefore, is a laning conveyor which can efficiently and effectively handle articles whose widths vary by a factor of about two or more. A laning conveyor in which the spacing of less than all the lanes may be adjusted for accommodating articles of different widths is also desired.

SUMMARY OF THE INVENTION

Accordingly, it is an object of the invention to provide a conveyor for laning articles having widths varying by a factor of about two or more.

Another object of the invention is to provide a laning conveyor in which the spacing of less than all the lanes may be adjusted to accommodate articles having varying widths.

Yet another object of the invention is to provide a laning conveyor for either moving a plurality of single files of articles to a downstream workstations, or for moving less than a plurality of single files of prepackaged units of articles to the downstream workstation.

Still another object of the invention is to provide a laning conveyor of the above character for moving two or more single files of articles to a packer.

A further object of the invention is to provide a rotatable guide for use in loading a mass of articles into lanes of a laning conveyor of the above character.

Yet a further object of the invention is to provide curved lane guide extensions for altering the space between adjacent single files of articles as they exit a downstream end of a laning conveyor of the above character.

Still a further object of the above invention is to provide a laning conveyor of the above character including a fixed center lane guide.

These and other objects are achieved by provision of a laning conveyor having a fixed central guide and movable lane guide units.

The lane guide units each have at least two guides connected thereto spaced apart a first lane width. The lane guide units are mounted on either side of the central lane guide to form lanes therebetween having the first lane width with the units in their first position. The laning conveyor including means for moving the lane guide units to a second position to provide the lanes with a second lane width. The second lane width larger than the first by a factor of at least about two.

Preferably the lane guides are mounted to cars for movement along a transverse track suspended above the conveyor surface. Most preferably, the cars are mounted to racks and the moving means comprises a pinion shaft and an actuator for advancing one of said cars and its rack to coordinately move said lane guides.

The laning conveyor preferably includes a lane loading guide for guiding articles into the lanes. The loading guide is most preferably movable to a second position for different size articles and movable to a second orientation for different type articles. The guide presenting a smooth surface in one orientation and an undulating surface in the other orientation.

The conveyor preferably also includes downstream lane guide extensions which may be curved or provided with varying thickness to position exiting single files of articles as desired for downstream operations. The extensions are most preferably mountable by dovetail blocks and quick release clamps for relatively easy adjustment between first and second positions for each of the lane sizes.

In other aspects, the laning conveyor comprises infeed device for a case packer, and the invention relates to a method of conveying articles having different widths.

The invention and its particular features and advantages will become more apparent from the following detailed description considered with reference to the accompanying drawings.

BRIEF DESCRIPTION OF THE DRAWINGS

FIG. 2 is a top plan view of a lane loading section of the laning conveyor of FIG. 1.

FIGS. 3A and 3B are schematic end elevation views of the laning conveyor of FIG. 1 as viewed from the lane loading section to illustrate the position and orientation of lanes and guides in the individual can and six-pack modes of operation.

FIGS. 4A, 4B, 4C and 4D are enlarged portions of FIGS. 3A and 3B illustrating changeover of the lane loading guide from individual can to six-pack orientation in the laning conveyor of FIG. 1.

FIGS. 5A, 5B, 5C and 5D are enlarged portions of FIG. 2 illustrating changeover of the lane loading guide from individual can to six-pack position in the laning conveyor of FIG. 1.

FIGS. 7A and 7B are enlarged cross-sectional end views of the lane guide section of the laning conveyor of FIG. 1 illustrating changeover of the lane guides from the individual can to the six-pack position.

FIGS. 8A and 8B are schematic top plan views of the lane loading, lane guide and single file spacing sections of the laning conveyor of FIG. 1 illustrating the position of lane guides and tapered lane guide extensions in the individual can and six-pack modes of operation.

FIG. 9 is a schematic end elevation view of the single file spacing section of the laning conveyor of FIG. 1 to illustrate mounting of the tapered lane guide extensions.

FIG. 10 is a partial cross-sectional view of the single file spacing section of the laning conveyor of FIG. 1 taken along the plane 10—10 of FIG. 9.

DETAILED DESCRIPTION OF THE INVENTION

Figure 1:
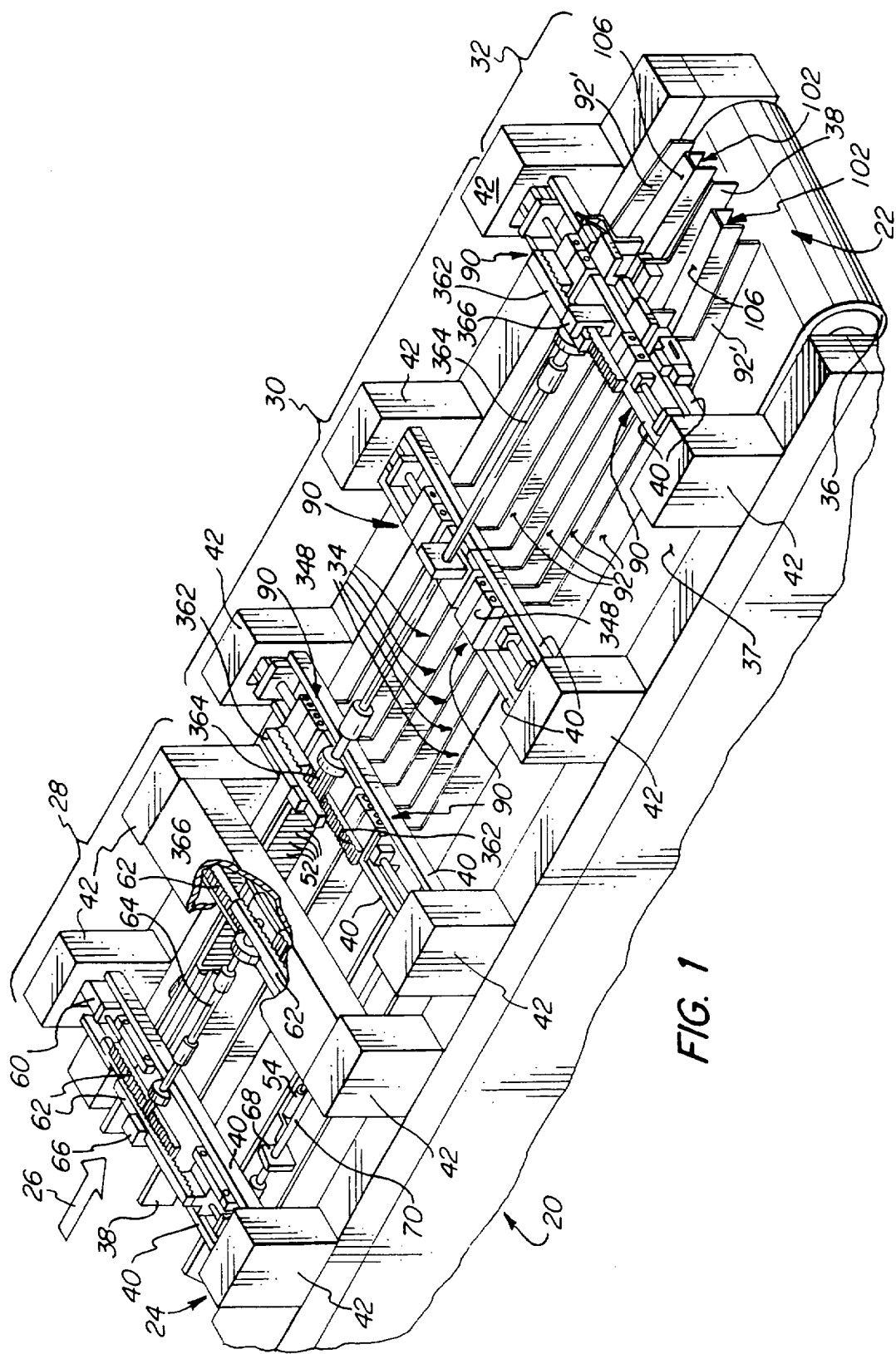
FIG. 1 is a front isometric view of a laning conveyor in accordance with the invention.

FIG. 1 depicts a laning conveyor 20 in accordance with the invention for producing single files of articles at downstream end 22 from a mass or separate lines of articles entering upstream end 24 and flowing through the conveyor in the direction of arrow 26. Laning conveyor 20 comprises a conveyor belt 36 having a conveying surface 37, central lane guide 38, and a plurality of support members 40 extending transversely across the conveyor substantially at a right angle to arrow 26. Support members 40 are mounted above conveyor surface 37 at their ends by vertical support members 42.

Although illustrated as a single endless, circulating belt, belt 36 may include several endless circulating belts, especially for applications requiring accumulation or grouping of articles.

Conveyor 20 is particularly designed to be relatively quickly and easily changeable for producing single files of two different size articles, having widths varying by at least about a factor of two, for downstream operations. The larger width articles may be prepackaged or prebundled units of multiple ones of the smaller width articles. Preferably, the articles are individual cans and six-packs or other bundled or prepackaged units, and the conveyor passes single files of either of these to a device for packing cases of cans.

Figure 5C:
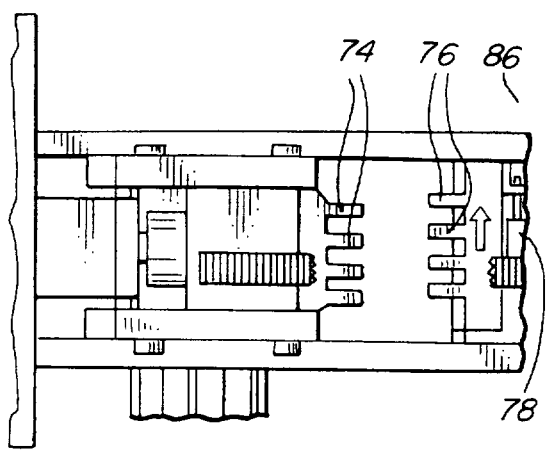
Figure 5D:
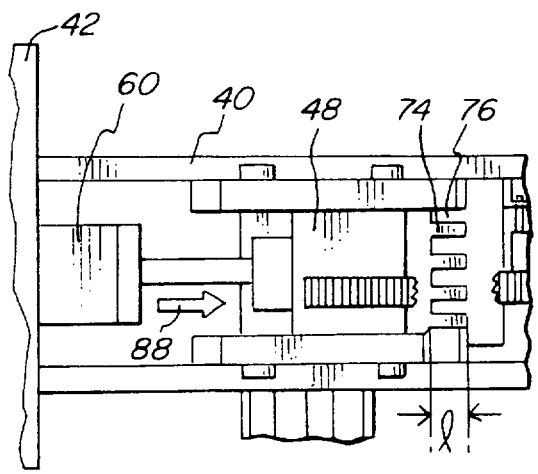
Figure 4C:
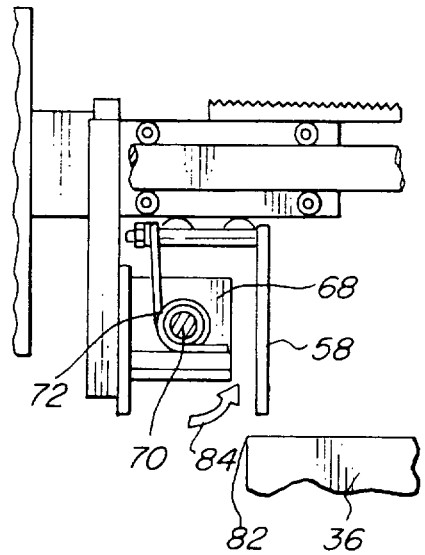
Figure 5C:
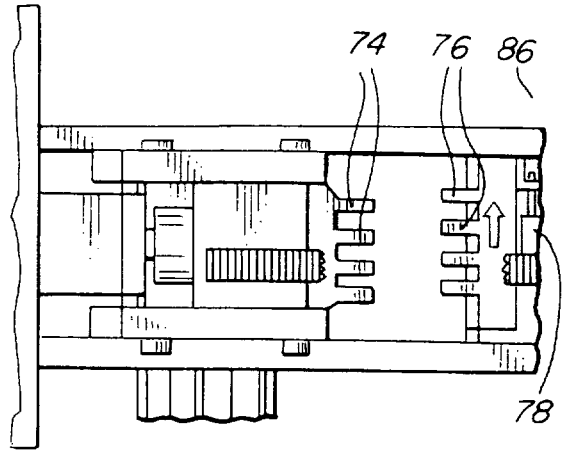
Figure 4D:
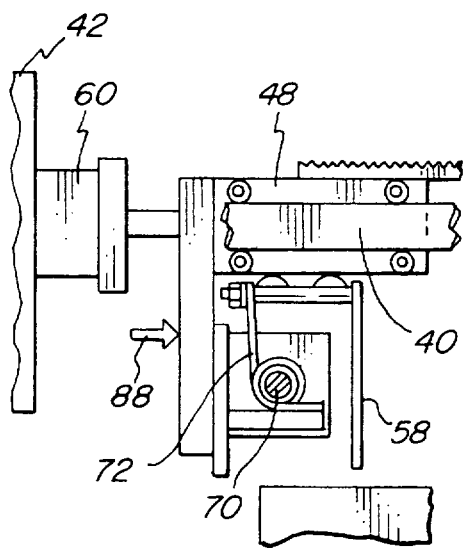
Figure 5D:
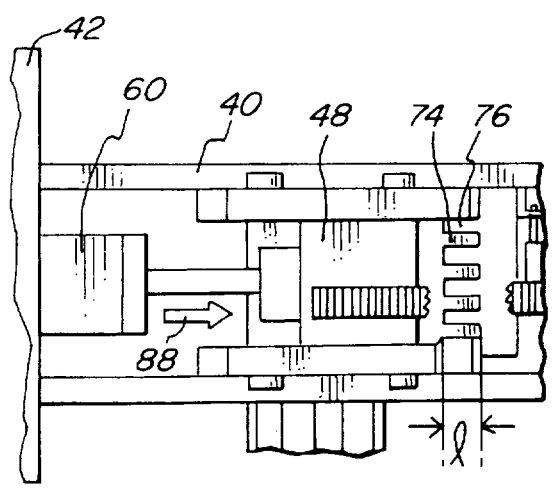
Figure 6:
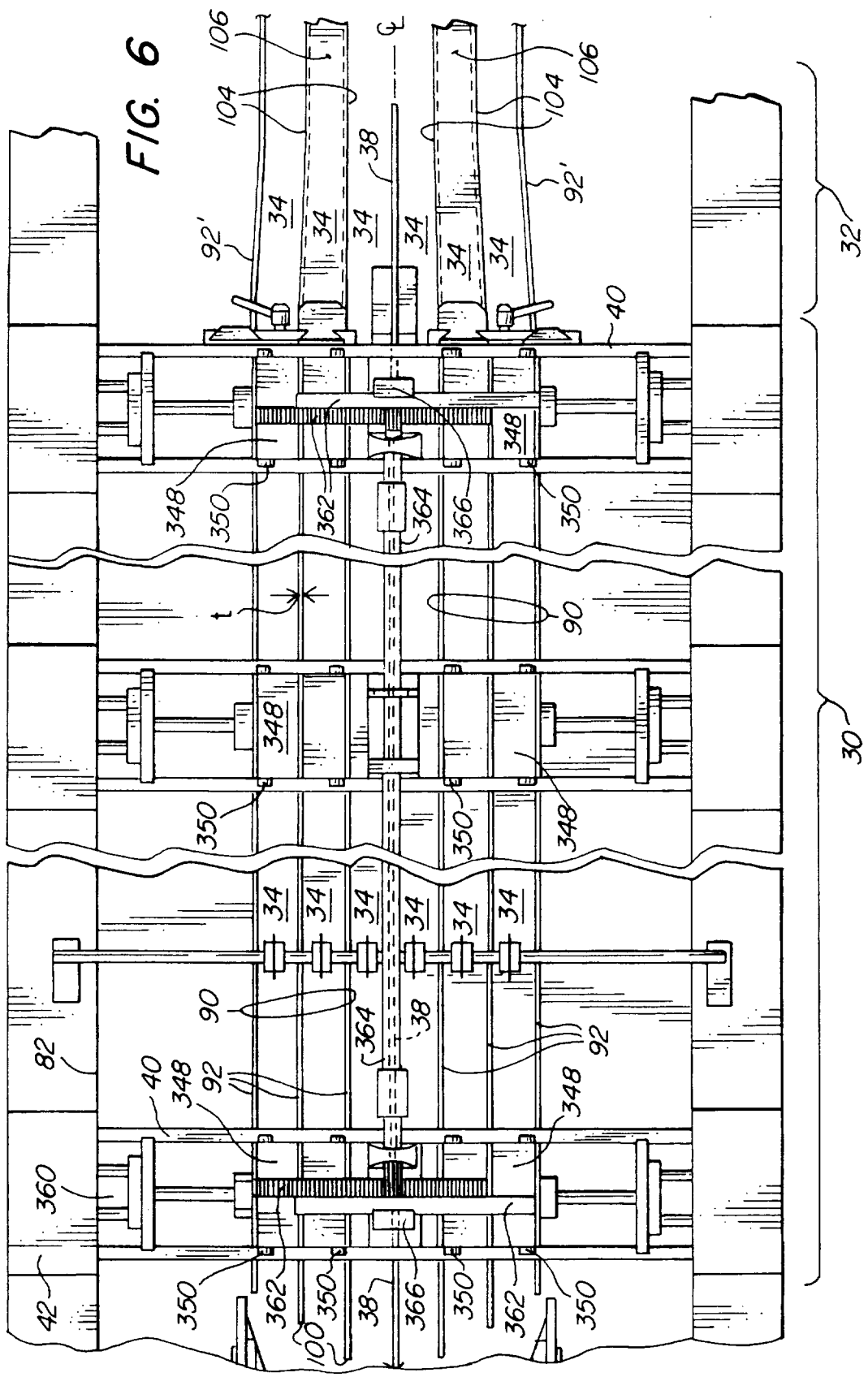
FIG. 6 is a top plan view of the lane guide section of the laning conveyor of FIG. 1.

Laning conveyor 20 includes three main sections: lane loading section 28 (see FIGS. 2, 3A–B, 4A–D and 5A–D), lane guide section 30 (see FIGS. 6, 7A–B and 8A–B), and single file spacing section 32 (see FIGS. 6, 9 and 10). Loading section 28 functions to load articles into lanes 34 of lane guide section 30, and single file spacing section 32 adjusts the spacing of adjacent single files as appropriate for downstream operations. Where articles are cans and prepackaged units of cans and the downstream operation is packing cases of cans, spacing section 32 preferably functions to reduce or substantially eliminate the lane guide thickness t (see FIG. 6) separating adjacent single files of cans for relatively tight-abreast packing. It is understood that laning conveyor 20 may include any one or combination of these sections or other conveyor sections having similar or other functions.

Referring now to FIGS. 1, 2 and 3A, lane loading section 28 of laning conveyor 20 is described in more detail. Lane loading section 28 comprises a pair of lane loading guides 44 connected by arms 46 to cars 48. Cars 48 include wheels 50, 51 for moving along tracks formed by a portion of transverse supports 40. Wheels 50 support the load of lane loading guides 44 and permit them to move along the tracks while wheels 51 prevent lane loading guides from torquing out of position above conveyor surface 37.

As illustrated in FIGS. 1, 2 and 3A, lane loading guides 44 are in a first position and a first orientation used to load individual cans into lanes 34. "Position" refers to location of the lane loading guide relative to central guide 38, and "orientation" refers to the guiding surface provided by the lane loading guide for the articles.

In the first position, loading guides 44 are located to load individual cans into lanes 34.

In the first orientation, loading guides 44 include a plurality of jostling strips 52 or other undulated surface for jostling the cans to prevent them from forming a nested pattern. Strips 52 are half rounds or the like of HI-FAX or similar low friction material with smooth outer surfaces, to reduce the possibility of damaging the cans, which are aligned substantially vertically for successively bumping cans inward toward central guide 38 as they pass downstream. A rod and cylinder assembly 54 mounted inside lane loading guide 44 reciprocates strips 52 in the direction of arrows 56 (see FIG. 2) to further jostle the articles.

To load six-packs or the like into wider lanes 34', loading guides are moved to a second position and rotated to a second orientation both of which are illustrated in FIG. 3B. The second orientation presents a smooth, flat surface 58 to guide the six-packs or other prepackaged units of articles. The second position aligns lane loading surfaces 58 further away from central guide 38 than strips 52 to load larger width articles or prepackaged units into wider lanes 34'.

Referring briefly to FIG. 1, 2, 3A and 3B, lane loading guides 44 are moved between their first and second positions by one or more rod and cylinder assemblies 60 which directly moves one or more cars 48 along transverse supports 40. It is understood that many other means for moving cars 48 exist such as electromagnets, motors and the like which may move the cars directly or indirectly, for example by a drive pinion (not shown).

Each car 48 is mounted to a rack 62 extending transversely across conveyor belt 36. A pinion shaft 64 lies between transverse pairs of cars 48 and racks 62 and coordinates positioning of lane loading guides 44 at either end of lane loading section 28. A clamp 66 may be used to prevent slippage or override of the teeth of racks 62 and pinion 64. It is understood that more than one cylinder may be used as necessary for reliable positioning of loading guides 44 relative to central guide 38.

Referring now to FIGS. 4A to 4D and 5A to 5D, the structure and process for orienting and positioning lane loading guides 44 is illustrated in series of partial views. FIGS. 4A to 4D are partial end views as in FIGS. 3A and 3B; FIGS. 5A to 5D are partial top views as in FIG. 2.

FIGS. 4A and 5A depict lane loading guide 44 in the first position and first orientation as shown in FIGS. 2 and 3A for loading lanes 34 with smaller width or individual articles such as cans. In this first orientation (FIG. 4A), a rotary actuator 68 connected to longitudinal shaft 70 holds strips 52 in the article guiding position against bias of spring 72. In this first position (FIG. 5A), stop fingers 74 connected to cars 48 abut stop fingers 76 held in a first position by rod and cylinder assembly 78 with its rod retracted.

FIGS. 4B and 5B depict the first step of movement toward the second position and second orientation illustrated in FIG. 3B for loading wider lanes 34' with larger width or prepackaged units or articles such as six-packs of cans. The rod in rod and cylinder assembly 60 is retracted to move lane loading guide 44 in the direction indicated by arrow 80, clear of edge 82 of conveyor 36 for rotation of the loading guide.

Figure 4C:
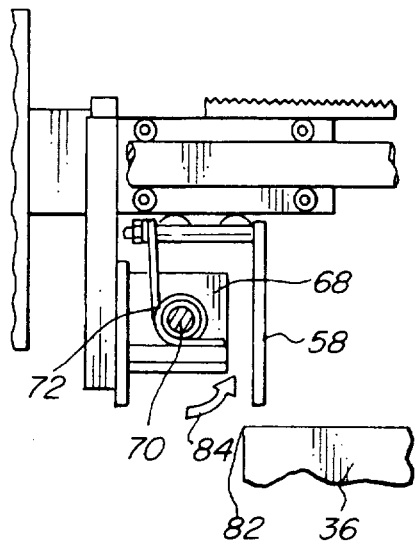

The next steps are illustrated in FIGS. 4C and 5C. In FIG. 4C, rotary actuator 68 is deactivated and lane loading guide rotates about shaft 70 in the direction of arrow 84 under bias of spring 72 to attain the second orientation. In FIG. 5C, stop fingers 76 are shifted as indicated by arrow 86 to a second position by extension of the rod of rod and cylinder assembly.

Figure 4D:
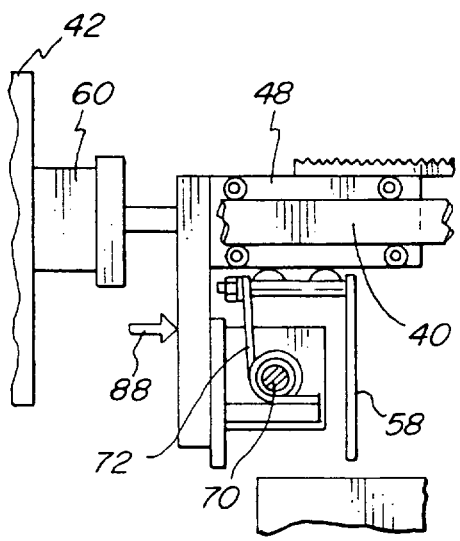

The final step in shifting from first position to second is illustrated in FIGS. 4D and 5D. The rod of rod and cylinder assembly 60 is extended in the direction of arrow 88 until fingers 74, 76 are fully enmeshed. The difference in distance to central guide 38 between the first and second positions is thus a function of the length 1 of the stop fingers. The difference in distance may also be function of any difference between shaft 70 and the article engaging surfaces 58, 52 in each of the several orientations of loading guide 44. It is understood that changeover from second position and orientation to first position and orientation is essentially achieved by reversing these steps except that rotary actuator 68 must be moved against bias of spring 72 to attain the first orientation.

Referring to FIGS. 1, 6 and 7A–B, lane guide section 30 is described. Lane guide section 30 includes central lane guide 38, preferably fixed near a centerline of laning conveyor 20, and a pair of lane guide units 90 mounted on either side of central guide 38 for coordinated movement toward and away from central guide 38 to produce lanes 34 therebetween at a first position (FIG. 7A) and wider lanes 34' therebetween at a second position (FIG. 7B). Lanes 34 have a width w slightly greater than a width of articles, such as individual cans, having a smaller of the article widths; Lanes 34' have a width W slightly greater than a width of articles, such as six-packs or other prepackaged units, having a larger of the article widths.

Lane guide units 90 include three lane guides 92 mounted to a car 348 and spaced apart the distance w to form two lanes 34 therebetween. For simplicity, structure in lane guide section 30 similar to structure in lane loading section 28 is labeled with similar identifying numerals, but including a prefix of "3", and is not again specifically described. Rod and cylinder assembly 360 moves cars 348 of lane guide units 90 toward and away from central guide 38 without altering the in-between spacing of lane guides 92 by extending and retracting the rod between a pair of stops 94, 96.

Stop 94 is mounted between transverse supports 40, and a front surface 98 of cars 348 abuts stop 94 with lane guide units 90 in the first position providing six lanes 34 (FIG. 7A). Stop 96 is connected to the rear of cars 348 to limit the amount the rod may be retracted by abutting the cylinder of assembly 360 with lane guide units 90 in the second position providing two lanes 34' (FIG. 7B). The inbetween spacing of lane guides 92 is not changed, and these lanes 34 are generally not used in applications where downstream operations require fewer lanes of greater width articles, although it is understood that these lanes could be used in other applications.

In this regard, laning conveyor 20 is particularly adapted to change between fewer lanes of greater width and relatively more lanes of relatively lesser width. An advantage of this design is that conveyor belt 36 can be narrower than if all guides were to be adjusted to width W. A related advantage is that laning conveyor 20 can handle larger articles having widths about two or more times greater than widths of smaller articles without making the entire conveyor two or more times wider. Another advantage is for use with downstream devices such as packers which pack units of articles such as cases either from individual articles such as cans or from prepackaged units such as six-packs of cans. By not adjusting every lane to accommodate the greater width articles, laning conveyor 20 effectively lanes articles having widths varying by a factor of about 2 or more, especially for downstream operations in which article width is inversely related to the required number of lanes—such as packers.

Referring briefly to the schematic top plan views of FIGS. 8A and 8B, the arrangement of lane loading guides 44 and lane guide units 90 in their first positions and first orientation (FIG. 8A) may be compared with their second positions and second orientation (FIG. 8B). Portions 98 of lane loading guides 44 extending downstream of strips 52 diverge away from central guide 38 toward outermost ones of lane guides 92. In this regard, strips 52 not only jostle the mass of articles but also squeeze them out into the area 99 between diverging guides 98 for loading into lanes 34 without excessive back pressure which might damage or crush articles against ends 100 of the lane guides.

Referring to FIGS. 1, 6, 9 and 10, the construction, function and operation of single file spacing section 32 are described. Section 32 includes an extension of central lane guide 38, as well as extensions 92' of the outermost lane guides of each of lane guide units 90. The two innermost lane guides 92 of lane guide units 90 end at the end of lane guide section 30.

Section 32 also includes a pair of lane guide tunnels 102, each of which includes a pair of lane guide extensions 104 for the other lane guides of lane guide units 90, and a spacer 106 for retaining guide extensions 104 in their positions spaced apart distance w.

With lane guide units 90 in their first position, forming six lanes 34 (also see FIG. 8A), lane guide tunnels 102 are mounted to transverse support 40 in a first position between central guide 38 and guide extensions 92' to provide continuation of six lanes 34. With lane guide units 90 in their second position, forming two lanes 34' (see FIG. 8B), lane guide tunnels 102 are mounted to transverse support 40 in a second position such that the innermost lane guides of tunnels 102 form the outermost guides continuations of two lanes 34'.

Guide extensions 92' and 104 all curve inwardly toward central lane guide 38 to minimize gaps between single files of articles or units exiting the lanes at downstream end 22 of laning conveyor 20. Similarly, downstream ends of guide 38 and guide extensions 104 are tapered to a thickness less than t (see FIG. 6), again to minimize the space between single files of articles or units. In this regard, spacers 106 of tunnels 102 function to retain relatively thin, curved or tapered guide extensions 104 in their proper positions. Minimal spacing between units is important for downstream operations such as packing in which it is desired to pack as many articles as possible, abreast in as small a case as possible.

It is understood that for other downstream operations requiring spaced apart or some other single file configuration, that the lane guide extensions could be curved outwardly, or thickened, or even not used, as necessary to provide the desired exiting single file spacing.

Referring again to FIGS. 6, 9 and 10, lane guide tunnels 102 are mounted to transverse support 40 for relatively quick and easy movement between the first and second positions by means of dovetail blocks 108 and quick release clamps 110. Dovetail blocks 108 include dovetail surfaces 112 and stops 114, and are connected to lane guide tunnels 102. Blocks 108 may be mounted in either of first or second dovetail slots 116, 118 to provide lane guide tunnels 102 respectively in the first and second positions. Dovetail slots 116, 118 are formed between pairs of end pieces 120 and quick release clamps 110 centrally located between the end piece pairs. Quick release clamps 110 include clamp blocks 122 and handles 124. End pieces 120 and clamp blocks 122 each include dovetail slot surfaces 126 for mating with dovetail block surfaces 112.

Referring particularly to FIG. 10, dovetail blocks 108 are slid into one of dovetail slots 116, 118 until stop 114 abuts end pieces 120 and clamp block 122. Handle 124 is turned to advance screw 125 and draw dovetail slot surfaces 126 on clamp block 122 into engagement with dovetail block surfaces 112 to clamp lane guide tunnel 102 into position. Dovetail blanks 128 may be used in slots not occupied by blocks 108 to prevent damage to quick release clamps 110 due to uneven clamping pressure. Return springs (not shown) may also be provided, for example in guide channels 130, to oppose clamping and aid in releasing the clamp block to move lane guide tunnels 102 between the first and second positions.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A device for preparing a packed case of articles comprising:
    a packing section for packing the articles into a case; and
    an infeed section including
        a conveying surface for conveying articles to said packing section,
        a first lane guide extending along said conveying surface,
        a lane guide unit mounted adjacent said first lane guide, said lane guide unit having at least two second lane guides connected thereto spaced apart from each other a fixed first distance to form a first single file article lane,
        a second single file article lane formed between said first lane guide and one of said second lane guides of said lane guide unit, said second single file article lane having a first width substantially equal to the first distance with said lane guide unit in a first position, and
        means for moving said lane guide unit from said first position to a second position to provide said second single file article lane with a second width greater than the first distance while maintaining the fixed first distance between the two second lane guides of the lane guide unit.

2. The device of claim 1 wherein said first lane guide is substantially fixedly mounted above the conveying surface.

3. The device of claim 1 wherein said second lane guides are substantially fixedly mounted to said lane guide unit.

4. The device of claim 1 wherein said infeed section includes a track mounted to the conveyor by a support member, the track aligned above the conveyor transversely of the conveying surface, and wherein said second lane guides are mounted to cars adapted to be slid along the track by said moving means.

5. The device of claim 4 wherein said infeed section includes racks connected to said cars, and wherein said moving means comprises a pinion shaft and an actuator for rotating said pinion to move said cars.

6. The device of claim 1 wherein said infeed section includes, at the upstream end, a lane loading guide for guiding individual ones of the articles into the lanes, said lane loading guide movable between a first position for guiding articles having the lesser width, and to a second position for guiding articles having the greater width.

7. The device of claim 6 wherein the articles having the lesser width are individual cans and wherein the articles having the greater width are prepackaged units of multiple cans.

8. The device of claim 6 wherein said lane loading guides are rotatable between a first orientation for preventing the articles from forming a nested pattern and a second orientation for substantially smoothly guiding the articles.

9. The device of claim 8 wherein said lane loading guide includes a reciprocal agitator for jostling the articles when said lane loading guide is in the first orientation.

10. The device of claim 1 wherein said infeed section includes, at the downstream end, tapered thickness lane guide extensions mountable in alignment with said second lane guides for reducing the spacing between the single files of articles.

11. The device of claim 10 wherein said lane guide extensions taper toward said first lane guide to bring the single files closer together.

12. The conveyor of claim 10 wherein said infeed section includes spacers for maintaining pairs of said lane guide extensions spaced apart a distance equal to the first width.

13. The device of claim 10 wherein said infeed section includes a support member extending transversely across the conveyor above the conveyor surface, and wherein said lane guide extensions are connected to dovetail blocks for mounting on said support member in each of two positions for each of two article sizes.

* * * * *